US009287760B2

(12) United States Patent
Pasternak

(10) Patent No.: US 9,287,760 B2
(45) Date of Patent: Mar. 15, 2016

(54) HIGHLY RELIABLE ACTUATOR WITH MULTIPLE DEGREES OF FREEDOM AND METHOD FOR MOVING A PAYLOAD USING THE ACTUATOR

(75) Inventor: Eliezer Pasternak, Palo Alto, CA (US)

(73) Assignee: REMEC BROADBAND WIRELESS HOLDINGS, INC., San Diego, CA (US)

( * ) Notice: Subject to any disclaimer, the term of this patent is extended or adjusted under 35 U.S.C. 154(b) by 598 days.

(21) Appl. No.: 13/590,104

(22) Filed: Aug. 20, 2012

(65) Prior Publication Data
US 2014/0049123 A1 Feb. 20, 2014

(51) Int. Cl.
*H02K 33/12* (2006.01)
*H02K 41/03* (2006.01)
*A63H 33/06* (2006.01)

(52) U.S. Cl.
CPC .............. *H02K 41/031* (2013.01); *H02K 41/03* (2013.01); *A63H 33/06* (2013.01); *H02K 2201/18* (2013.01)

(58) Field of Classification Search
CPC . H02K 41/031; H02K 41/03; H02K 2201/18; A63H 33/06
USPC ......................................................... 310/38
See application file for complete search history.

(56) References Cited

U.S. PATENT DOCUMENTS

| 1,481,256 | A | * | 1/1924 | Dols ............................ 446/133 |
| 4,634,889 | A | | 1/1987 | Foggia et al. |
| 4,719,381 | A | * | 1/1988 | Miles ........................... 310/166 |
| 4,739,241 | A | * | 4/1988 | Vachtsevanos et al. .. 318/568.19 |
| 5,204,573 | A | | 4/1993 | Bederson et al. |
| 5,410,232 | A | | 4/1995 | Lee |
| 5,798,590 | A | | 8/1998 | Sakakibara |
| 6,320,284 | B1 | | 11/2001 | Fontana et al. |
| 7,675,208 | B2 | | 3/2010 | Bandera |
| 2002/0096956 | A1 | | 7/2002 | Erten |
| 2002/0153982 | A1 | * | 10/2002 | Jones et al. .................... 335/220 |
| 2003/0178901 | A1 | | 9/2003 | Erten et al. |
| 2004/0124717 | A1 | * | 7/2004 | Corcoran et al. ............... 310/12 |
| 2008/0073989 | A1 | * | 3/2008 | Bandera ........................ 310/80 |

OTHER PUBLICATIONS

PCT Search Report dated Dec. 17, 2013 corresponding to the related PCT Patent Application No. US2013/049598.

* cited by examiner

*Primary Examiner* — Joshua Benitez-Rosario
*Assistant Examiner* — Leda Pham
(74) *Attorney, Agent, or Firm* — DLA Piper LLP (US)

(57) ABSTRACT

An actuator that has two or more degrees of freedom that moves a payload are described. The actuator may have two members, an actuator stator and an actuator armature, with the ability to move relative to each other in two or more degrees of freedom.

13 Claims, 5 Drawing Sheets

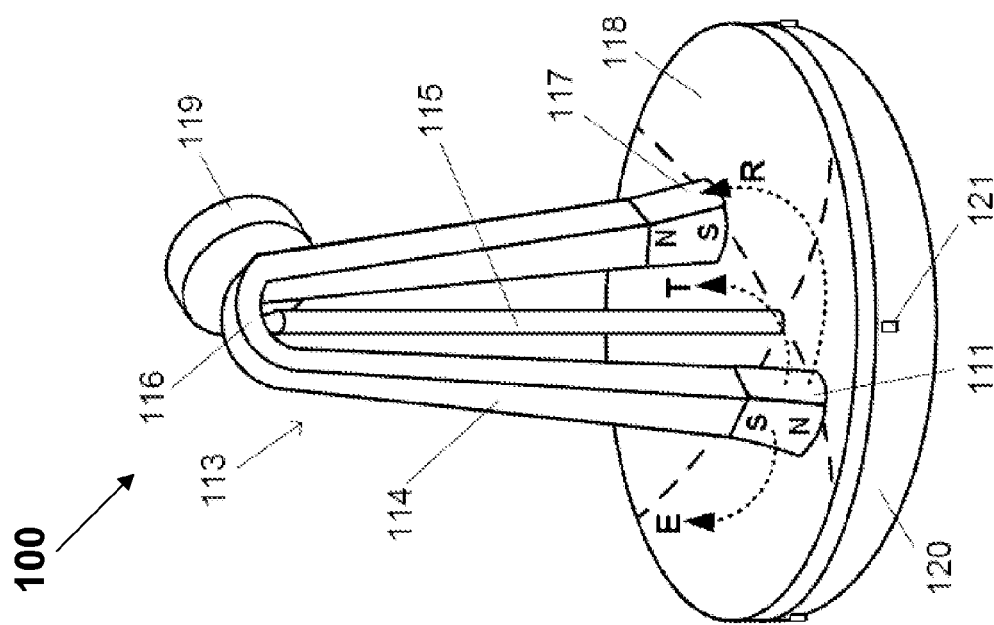
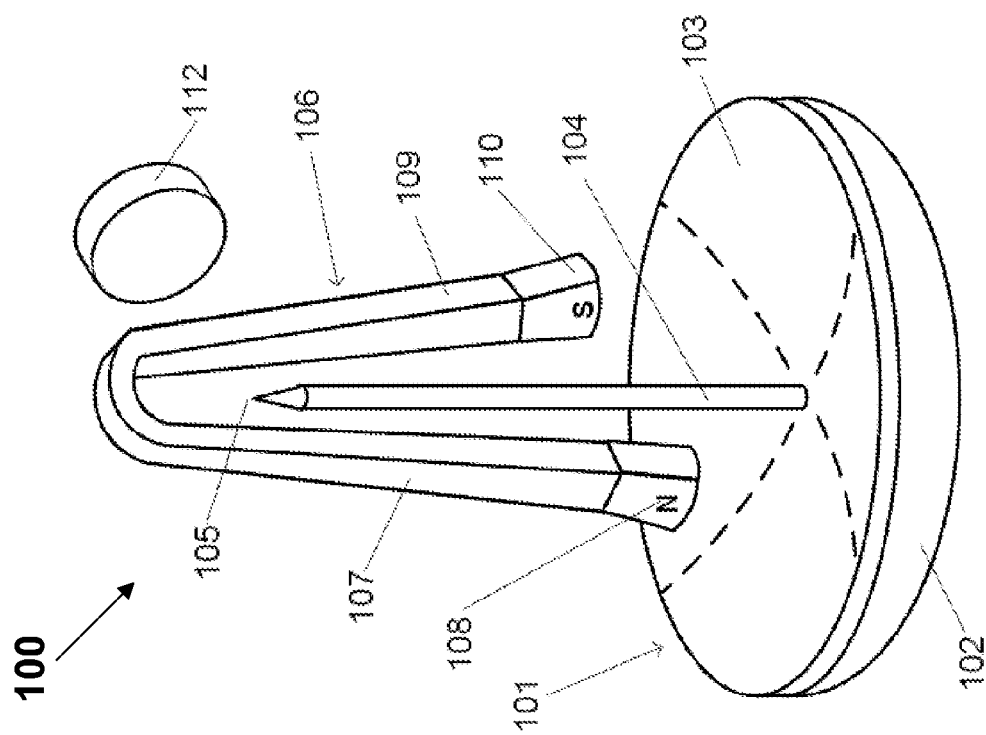
Fig. 1A
Fig. 1B

HIGHLY RELIABLE ACTUATOR WITH MULTIPLE DEGREES OF FREEDOM AND METHOD FOR MOVING A PAYLOAD USING THE ACTUATOR

FIELD

This disclosure relates generally to the fields of electromechanical actuators with more than one degree of freedom of motion.

BACKGROUND

Actuators with two or more degrees of freedom are used in a wide range of applications including antenna beam steering, security camera and robotics. Typical implementations include multiple stages of motion which necessitate complex mechanical structures including gimbals structures, gears and bearings. Furthermore, electrical components on the moving stages may require electrical wiring that move with the stage, further degrading the system's reliability.

Various electromechanical actuator designs have been proposed in which motion in two or more degrees of freedom is accomplished by permanent magnets interacting with current carrying conductors arranged in two or three dimensions. These actuators still have shortcomings which include requiring multiple moving parts such as gimbals, bearings and rolling surfaces. Some actuators do not provide adequate means for winding the conductors and effective paths for heat sinking of these conductors. Yet other actuators excessively block the desired movement of the mechanical payload. The overall result is an actuator with poor reliability and limited or difficult use.

It is desirable to provide an actuator that has two or more degrees of freedom that addresses the above shortcomings and others and it is this end that the disclosure is directed.

SUMMARY

The actuator includes two members with ability to move relative to each other in two or more degrees of freedom. These two members are referred below as "actuator stator" and "actuator armature", respectively. The actuator stator has a body that contains a concave spherical surface with plurality of electric conductors placed in close proximity to at least a portion of the concave spherical surface. The electrical conductors overlap in a manner that allows carrying at least two independent currents in non-parallel directions in at least one location on that concave spherical surface. The actuator armature had one or more permanent magnets of which at least one magnetic pole is held in close proximity against the concave spherical surface and the actuator armature has freedom to pivot around a point at a center of a sphere formed if the concave spherical surface were extended to form an entire sphere. The actuator armature also may have a support structure held at a fixed position relative to the actuator stator that provides a pivot point for the actuator armature. A payload, such as a reflecting surface, is attached to the actuator armature, enabling the payload to move in two or more degrees of freedom. If more than two degrees of freedoms are desired, the actuator armature may contain at least two magnetic poles held in close proximity to separate current-containing regions on the concave spherical surface of the actuator stator.

BRIEF DESCRIPTION OF THE DRAWINGS

FIGS. 1A and 1B shows an embodiment of an actuator with a payload.

DETAILED DESCRIPTION OF ONE OR MORE EMBODIMENTS

Figure 2:
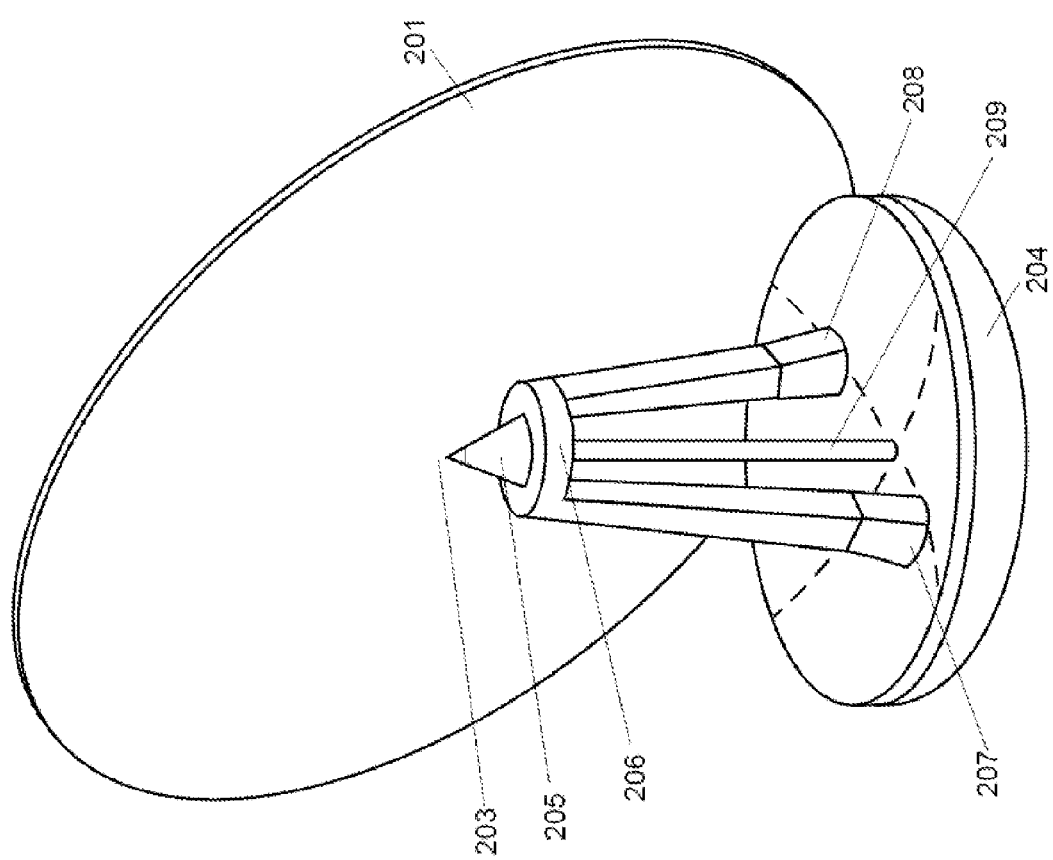
FIG. 2 shows another embodiment of the actuator with an oversize payload.

The actuator described below may be used for a payload such as a reflecting surface for a microwave radio and it is in this context that the actuator is described. However, it should be understood that the actuator may be used to move any type of payload including oversized payloads and the actuator is not limited to any particular type of payload. Furthermore, the actuator may be implemented differently than the embodiments shown in the figures and described below and the disclosure is not limited to the implementations below.

FIGS. 1A and 1B shows an embodiment of an actuator 100 with a payload 112. In particular, FIG. 1A shows the actuator 100 without the payload 112 attached while FIG. 1B illustrates the actuator 100 with the payload 112 attached to the actuator armature. The actuator has an actuator stator 101 that has a body 102 including a concave fraction of a spherical surface 103. The actuator also has a support arm 104 that extends from the body 102 ending with a pivot point 105. In one embodiment, the support arm may be attached to a center point of the fraction of the concave spherical surface 103. The actuator may further comprise an actuator armature 106 that has at least one arm 107 that has a magnetic pole 108 at an end of the arm 107. In some embodiments, the actuator armature may also have an opposite arm 109 that has a magnetic pole 110 at an end of the arm 109. The magnetic pole at the end of the opposite arm 109 may be of an opposite polarity to the pole 108. The two-arm actuator armature 106 in FIGS. 1A and 1B resembles a horseshoe magnet and can be made in that manner. In one embodiment, each arm 107, 109 uses a separate magnet 111 (having both a north pole and south pole as shown in FIG. 1B) mainly for saving weight and reducing the cost due to the expensive magnetic materials.

The payload 112 that is moved by the actuator depends on the application and may include a reflective mirror, a camera or a light source. An assembled actuator and payload 119 is shown in FIG. 1B. An actuator armature 114 in FIG. 1B is held in contact with a support arm 115 at a pivot point 116, keeping two magnet tips 111 and 117 (at each end of the armature actuator) suspended above a concave surface 118. A payload 119 is mechanically coupled to the actuator armature 114 at any desired point, usually in close proximity to the pivot point 116. Two or more overlapping electric currents flowing at or near the concave surface 118 apply electromotive force on the magnet poles 111 and 117. Having two independent current pairs at the region under the poles 111 and 117 allow each magnet to be pushed independently of each other in any direction tangent to the surface 118. Such independent forces provide the actuator armature 114 with three degrees of freedom of motion (3D) around the pivot point. The degrees of freedom are referred below as "Rotation" R, "Elevation" E and "Tilt" T and whose direction of influence are depicted in FIG. 1B. The actual meaning of these degrees of freedom depends on the application thus this naming is arbitrary. These angles are corresponding within a + or − sign convention to the well known Euler Angles and are sometimes named "Heading", "Pitch" and "Bank". The embodiment in FIG. 1B allows unlimited rotation R like a conventional electric motor, the elevation E is limited by one of the poles 111 or 117 hitting the support arm 115 and tilt T is limited by the poles reaching a limit of two independent currents along the surface 118. The pivot point interface is made to allow motion freedom at least up to the E and T limits discussed above. Such limiting of elevation and tilt is acceptable in optical application and the limits can be increased by increasing the spherical angle of the surface 118.

The actuator armature 114 is held against the surface 118 by attraction force provided by gravity or magnetic attraction between the poles 111, 117 and an actuator stator 120. Having a single pivot point 116 allows minimal friction and very high reliability. The application of currents for producing a desired movement of the actuator and thus the payload depends on the position of the poles 111 and 117 above the surface 118 and the actuator stator 120 has one or more position sensors 121 that are attached to the actuator stator 120. The one or more position sensors may be, for example, hall-effect sensors or other sensors that are capable of sensing the position of the poles 111, 117 relative to the surface 118. In one embodiment, there may a position sensor in the middle of the perimeter arc of each petal 303 of the rosette (shown in FIG. 3) at the outside of the actuator stator 120 at the lowest level of the non-ferromagnetic top layer 409 shown in FIG. 4.

An embodiment of an actuator 200 capable of moving oversize payloads is shown in FIG. 2. In this embodiment, a large object 201, such as aluminum mirror or radio wave reflector, is attached to an actuator armature 202 near a pivot point 203. The term "oversize" describes a payload that extends beyond the edge of an actuator stator 204. A thin cone 205 provides better proximity for attaching the payload near a tip 203. This cone 205 also allows a wide margin of actuator armature vertical displacement without falling from an actuator stator arm 209. The actuator armature 202 includes a bridging ring 206 for both strength and continuation of magnetic flux between magnets 207, 208 on each arm along the actuator armature 202.

Figure 3:
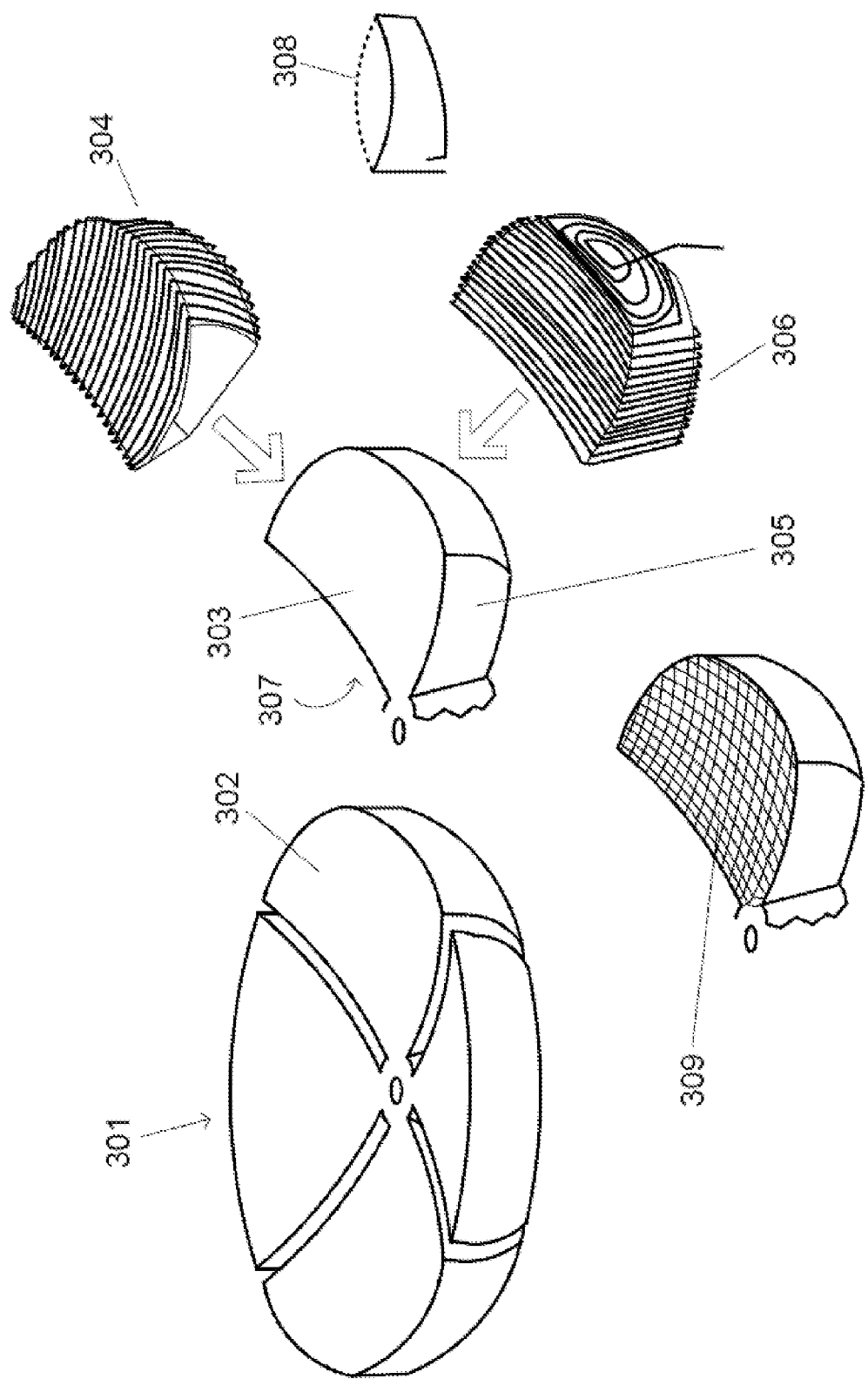
FIG. 3 shows the actuator stator rosette and conductors windings.

A body 301 of an actuator stator and coil windings associated with the actuator stator are depicted in FIG. 3. The actuator stator body 301 has a "rosette" shape with multiple "petals" 302 connected at the rosette's center. Each petal 302 carries its own two sets of overlapping windings of magnet wires. For instance, a petal 303 has a coil 304 and a coil 306. The coil 304 is wound around most of the petal 303 surfaces except for a face 305 that faces the viewer in FIG. 3 and the coil 306 wound around most of the petal 303 surfaces except for a face 307. In some embodiments, the coils 304 can be made slightly larger to enclose the coil 306. In that embodiment, the assembly process includes first mounting the coil 306 onto the petal 303 and then mounting the coil 304 on top of 306. The winding of a coil on a concave surface might be labor intensive so that the coil may initially have a convex shape 308 so that it can be fit onto the petal and then be collapsed onto the concave surface of petal 303 after mounting. When both coils 306 and 304 have been mounted on the petal 303, the concave surface is mostly covered by two non-parallel sets of conductors 309 (that form a grid pattern) wherein the rest of the original coils 304, 306 are not shown for the purpose of emphasizing the main active area.

Figure 4:
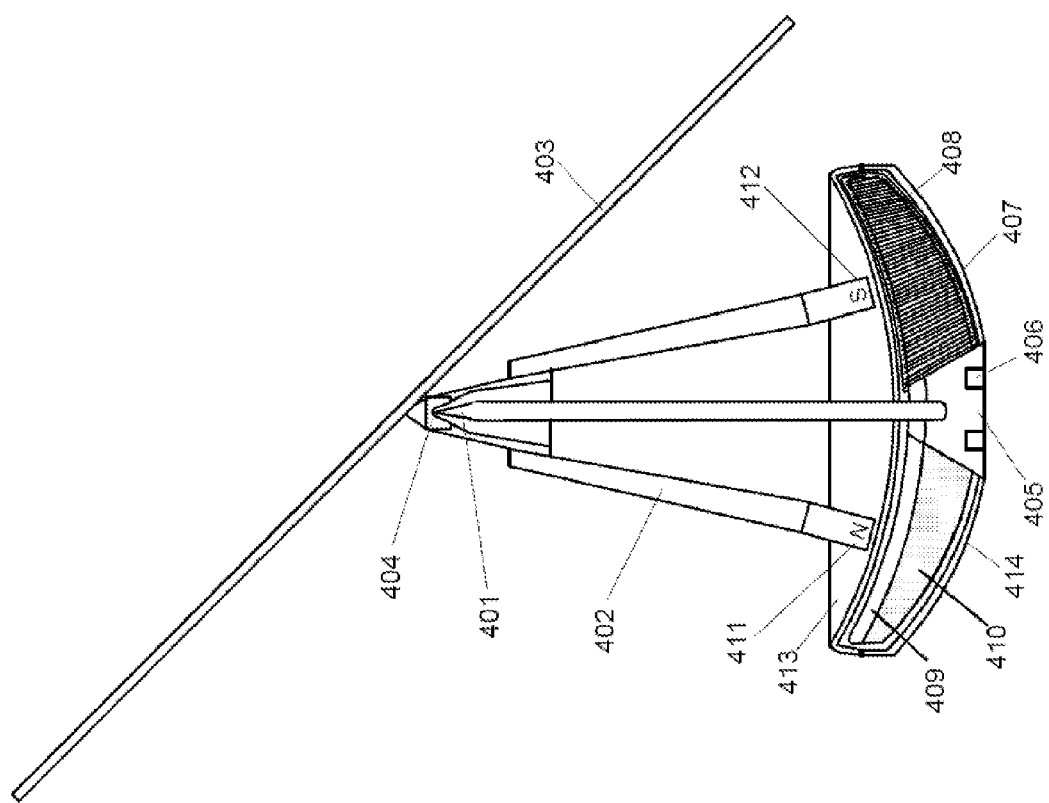
FIG. 4 shows a cross section of an embodiment of the actuator and payload exposing selected components for detailed view.

Further details of features of the armature are depicted in FIG. 4 that shows a cross sectional view through the armature and an oversize payload as shown in FIG. 2. In this figure, a mounting tip 401 of the support arm (not labeled) is touching an actuator armature 402 and payload 403 assembly using a cup bearing 404, usually known as jewel bearing. The bearing 404 reiterates the emphasis on very high reliability for the actuator operation because the small size of the bearing 404 allows the mounting of the load 403 near the pivot point, minimizing the payload 403 occupied space as the payload exercises the entire desired degrees of freedom.

The high reliability advantage of the single jewel or another cup-type bearing might be beneficial even if the application does not require the 3D capability. For instance, antenna or round-mirror positioning might tolerate 2D, ignoring the small tilt variations. In that case, the bearing 404 might be replaced by a 2D bearing, such as a universal joint, or, for preserving the reliability, 3D is maintained by the jewel bearing, and depending on the application, either tilt is ignored, or tilt is controlled by the coil currents to remain zero.

As shown in FIG. 4, a center cone cross section of a center of a rosette 405 is trapezoid-shaped, leaving a larger area at the bottom for mounting holes 406 as shown and enhancing the rosette strength and providing better path for magnetic flux and cooling heat dissipated at the conductors. In FIG. 4, one pair of windings is shown including one coil 407 with a wall facing the viewer and one coil 408 open towards the viewer. Another petal is shown with the coils absent for visible clarity. The petal, as well as the entire rosette's body consists of two layers; a non-ferromagnetic layer 409 that is in proximity to the actuator armature magnet poles 411 and 412, and a ferromagnetic layer/body 410 below. The ferromagnetic layer 410 provides a magnetic flux path between the poles 411 and 412 which also shields the faces of the coils at the bottom of the rosette. The layer 409 provides a magnetic flux gap for controlling the attractive force between the magnets 411 412 and the layer 410. Another option for the materials of the layers is making both layers 409 and 410 of the same, moderately ferromagnetic material, which might allow injection molding of the entire rosette body.

The rosette and its coils can be enclosed by a protective layer consisting of surfaces 414 and 413. Both surfaces can be made of metal. The top surface 413 is preferably a non magnetic conductor, such as aluminum, which also provides electromagnetic dumping of mechanical vibrations of the actuator armature 402 in the presence of the magnets 411 and 412.

Figure 5:
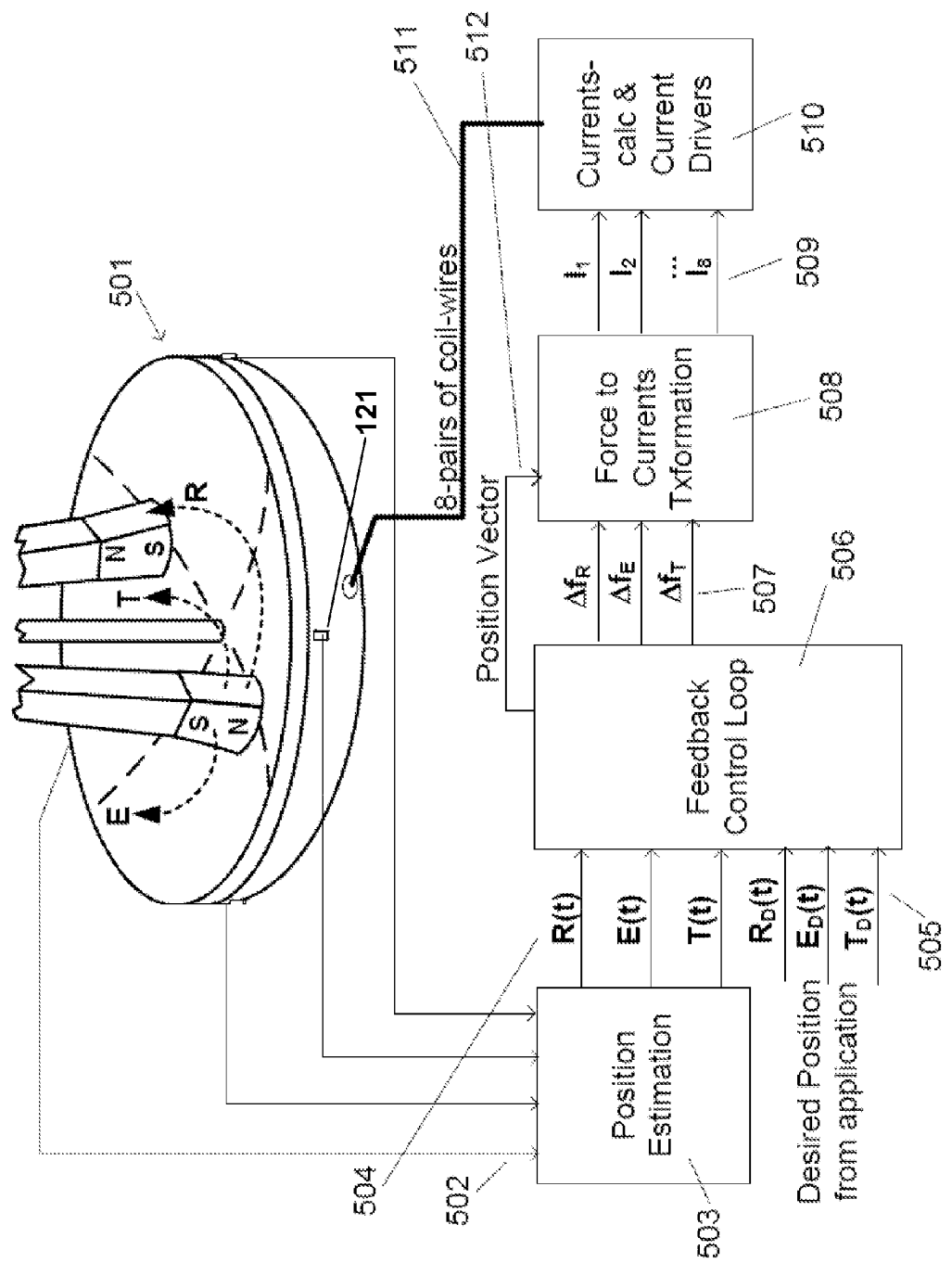
FIG. 5 shoes a block diagram of a position control loop for the actuator.

The actuator disclosed above can be incorporated into a large variety of systems. While the types of motions involved may vary per each application, an embodiment of a closed-loop feedback control system useful for many applications is shown in FIG. 5. An actuator 501 is attached to a set of wires 502 that connect the one or more position sensors 121 described above to a Position Estimation block 503 of the control system that estimates the position of the actuator. This block (as well as the other blocks and circuits of the control system) may be implemented by software in a microprocessor or similar digital processing circuit. The instantaneous position of the actuator has been parameterized by the three variables R,E,T which can be described as "position vector" (R,E,T). The position estimation 503 is performed by running an inverse lookup table of a pre-performed calibration between the actual (R,E,T) and the sensors values. An estimated position vector 504 {R(t), E(t) and (T(t) at a particular time t} is fed into a feedback control unit 506. The time variable t depicted in 504 emphasizes the dynamic nature of the motions and the actual signals are discrete time samples. The feedback control unit 506 performs dynamic closed loop control functions based on a mechanical model of the actuator 501 operating with the specific payload for a given application. A higher-level control function provides a desired target vector 505 {$R_D(t)$, $E_D(t)$ and ($T_D(t)$ at a particular time t} to the control loop 506 and the loop 506 outputs the required force increments 507 {$\Delta f_R$, $\Delta f_E$, $\Delta f_T$ at a particular time t} needed for the motion task to move the payload as requested. The higher level control function may be running on a computer or is an application or system that uses the actuator to reposition a payload which is not shown in FIG. 5 that generates the signal 505 and performs the process 506. For example, when the actuator is being used to position a mirror to detect a laser beam at a target, the computer of the system knows the location of the target and instructs the actuator to move the mirror to the appropriate position. As another example, a person with a pair of joysticks inputting a desired angular position of a target he wants to illuminate may generate the signal 505.

The force increments 507 can be described as a "force vector". Due to the rigid structure of the actuator's actuator armature, this force vector is directly proportional to corresponding torque components. The control loop 506 mission can now be modeled by conventional mechanics of rigid bodies. The exact models involve equation known as Euler Equations, which are non-linear and have no general close-form solutions. A broad variety of solutions are adapted for each application. In one embodiment, the control is divided into a local stabilization process and special purpose large movement processes. Thus, if the difference between the desired position vector 505 and the estimated vector 504 is small, the local model is used, including conventional three-variable linear control loop based on dynamic equations such as Equation 15 in Section 4.5 of appearing in the book of P. C. Hughes, Spacecraft Attitude Dynamics, John Wiley and Sons, 1986 that is incorporated herein by reference. For large position changes, a set of pre-stored maneuvers are used for moving from the current position and arriving at the vicinity of the destination.

By way of example, the requirements of a maneuver library are estimated for a particular choice of precision and system dynamic resolution. In this example large maneuvers are specified on a grid of 5 degrees, the library of maneuvers includes 4 grid-steps per elevation, 4 per tilt and 44 for rotation-change from current value of R to R plus a number between 5 and 180 degrees at a resolution of 5 degrees. Starting with 16 initial (E,T) options and ending with 4E×4T× 34R options, there are 8,704 maneuvers to store. Each maneuver is a sequence of the force vector 507. In this example a maneuver may last 3 seconds, require 10 time-samples per second and three bytes per force vector. Each maneuver thus requires 90 bytes. The entire storage is thus 783,360 bytes, well within the capabilities of a microprocessor's memory. Interpolation within adjacent steps can provide even higher accuracy.

A second example of even much smaller library at the expense of longer maneuver time includes first 15 sub maneuvers bringing one of the non-zero combinations of (E,T) to (0,0), then 34 sub maneuvers of the vector (R,E,T) from (0,0,0) to (R,0,0) and then the final 15 sub maneuvers to change (E,T) to the desired grid position if non-zero. Total of 64 sub-maneuvers have been required.

Once the incremental force-step 507 has been output by the control loop 506, the forces are converted to current vectors by a calculation function/transformation 508 using a position vector knowledge 512 from the control loop, the corresponding actuator armature poles position and Lorentz law and the coils arrangement in the actuators to calculate the current in each coil. If a pole is above two adjacent coils, both pairs of coils are driven to the same current vector. These current values I1 through I8 are output to a driver block 510 which performs current level setting and driving and drives the coil wires 511. This driver 510 uses a DC motor current driving techniques including Pulse Width Modulation and full bridge transistor drivers.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. An actuator providing movement with at least two degrees of freedom, comprising:
an actuator stator body with a concave spherical surface; at least two overlapping sets of electric conductors located in proximity to the concave spherical surface wherein each set of the electric conductors is not parallel to the other set of electrical conductors and may conduct current independent of the other set of electrical conductors;
a support structure extending vertically away from said actuator stator body, the support structure having a first end attached to a center point of the concave spherical surface and a second end vertically away from the actuator stator body; and
an actuator armature structure mounted on the second end of the support structure that is free to pivot about the center point of the concave spherical surface, wherein the actuator armature has at least one magnet pole held in proximity to the concave spherical surface to move the actuator with at least two degrees of freedom.

2. The actuator of claim 1, wherein the actuator armature has a joint that allows the actuator armature to pivot freely about the center point of the concave spherical surface.

3. The actuator of claim 1 further comprising a payload structure that is coupled to the actuator armature.

4. The actuator of claim 3, wherein the actuator stator body further comprises a rosette structure with plurality of petals wherein each petal has a concave surface, wherein at least one of the petals includes two sets of coils wrapped around the petal providing overlapping non-parallel windings on the concave surface of the petal.

5. The actuator of claim 4, wherein the rosette structure has a ferromagnetic layer.

6. The actuator of claim 5, wherein the rosette structure has a non-ferromagnetic layer.

7. The actuator of claim 2, wherein the joint is a jewel bearing.

8. The actuator of claim 1, wherein the actuator armature structure has a first arm with a magnetic pole at the end of the first arm adjacent to the concave spherical surface and a second arm with a magnetic pole at the end of the second arm adjacent to the concave spherical surface.

9. The actuator of claim 8, wherein the magnetic pole of the first arm has an opposite polarity of the magnetic pole of the second arm.

10. The actuator of claim 1, wherein the actuator armature structure has a second magnetic pole held in proximity to the concave spherical surface to move the actuator with at least three degrees of freedom.

11. An actuator that provides movement with at least three degrees of freedom, comprising:
an actuator stator body with a concave spherical surface;
at least two overlapping sets of electric conductors located in proximity to the concave spherical surface wherein each set of the electric conductors is not parallel to the other set of electrical conductors and may conduct current independent of the other set of electrical conductors;

a support structure extending vertically away from said actuator stator body, the support structure having a first end attached to a center point of the concave spherical surface and a second end vertically away from the actuator stator body; and an actuator armature structure mounted on the second end of the support structure that is free to pivot about the center point of the concave spherical surface, wherein the actuator armature has at least two magnet poles held in proximity to the concave spherical surface to move the actuator with at least three degrees of freedom.

12. The actuator of claim 1, wherein the actuator armature structure further comprises a curved central region that rests on the second end of the support structure and two arms that extend down from the curved central region towards the actuator stator body.

13. The actuator of claim 11, wherein the actuator armature structure further comprises a curved central region that rests on the second end of the support structure and two arms that extend down from the curved central region towards the actuator stator body.

* * * * *